(12) United States Patent
Choi et al.

(10) Patent No.: US 9,042,028 B2
(45) Date of Patent: May 26, 2015

(54) ELECTROWETTING PRISM DEVICE AND MULTI-VIEW 3D IMAGE DISPLAY APPARATUS INCLUDING THE SAME

(71) Applicant: Samsung Electronics Co., Ltd., Suwon-si (KR)

(72) Inventors: Kyu-hwan Choi, Yongin-si (KR); Jung-mok Bae, Seoul (KR); Yong-joo Kwon, Yongin-si (KR); Yun-hee Kim, Seoul (KR); Yoon-sun Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 13/895,427

(22) Filed: May 16, 2013

(65) Prior Publication Data

US 2014/0126038 A1 May 8, 2014

(30) Foreign Application Priority Data

Nov. 6, 2012 (KR) .................. 10-2012-0125081

(51) Int. Cl.
| | |
|---|---|
| G02B 1/06 | (2006.01) |
| G02B 3/12 | (2006.01) |
| G02B 26/00 | (2006.01) |
| G02B 27/22 | (2006.01) |

(52) U.S. Cl.
CPC .......... G02B 26/005 (2013.01); G02B 27/2242 (2013.01); *G02B 27/225* (2013.01)

(58) Field of Classification Search
CPC ....... G02B 3/14; G02B 26/004; G02B 26/005
USPC ................................................. 359/665, 666
See application file for complete search history.

(56) References Cited

U.S. PATENT DOCUMENTS

| | | | |
|---|---|---|---|
| 7,515,340 B1 | 4/2009 | Shiu et al. | |
| 7,646,525 B2 | 1/2010 | Cheng et al. | |
| 2008/0198292 A1 | 8/2008 | Marra et al. | |
| 2008/0316302 A1 | 12/2008 | Vos et al. | |
| 2011/0299171 A1* | 12/2011 | Sato et al. | 359/619 |
| 2011/0304572 A1 | 12/2011 | Wang et al. | |
| 2011/0316764 A1 | 12/2011 | Parry-Jones et al. | |

FOREIGN PATENT DOCUMENTS

| | | |
|---|---|---|
| KR | 100873283 B1 | 12/2008 |
| WO | 2005096069 A1 | 10/2005 |
| WO | 2009050273 A2 | 4/2009 |

* cited by examiner

*Primary Examiner* — William Choi
(74) *Attorney, Agent, or Firm* — Sughrue Mion, PLLC

(57) ABSTRACT

Provided are an electrowetting prism device which has increased an aperture ratio by simplifying an electrode and wiring structure, and a 3D image display apparatus capable of providing a super multi-view 3D image using the electrowetting prism device. The electrowetting prism device includes lower and upper transparent substrates disposed against each other, a vertical wall mounted on the lower transparent substrate so as to form a diamond-shaped space, a first electrode arranged along two adjacent sidewalls of the vertical wall, a second electrode arranged along the other remaining two adjacent sidewalls of the vertical wall to be disposed against the first electrode, and a non-polarized liquid and a polarized liquid arranged within a space surrounded by the vertical wall.

23 Claims, 7 Drawing Sheets

ELECTROWETTING PRISM DEVICE AND MULTI-VIEW 3D IMAGE DISPLAY APPARATUS INCLUDING THE SAME

CROSS-REFERENCE TO RELATED PATENT APPLICATION

This application claims priority from Korean Patent Application No. 10-2012-0125081, filed on Nov. 6, 2012, in the Korean Intellectual Property Office, the disclosure of which is incorporated herein in its entirety by reference.

BACKGROUND

1. Field

Apparatuses consistent with exemplary embodiments relate to an electrowetting prism device and a multi-view three-dimensional (3D) image display apparatus including the same, and more particularly, to an electrowetting prism device which has increased an aperture ratio by simplifying an electrode and wiring structure, and a 3D image display apparatus capable of providing a super multi-view 3D image using the electrowetting prism device.

2. Description of the Related Art

Recently, there has been an increasing need, in various fields such as a game, advertisement, medical image, military purpose, etc., for a 3D image display apparatus which provides a stereo image. Additionally, as high resolution televisions (TVs) are popularized, 3D TVs, which display stereo images, are being gradually commercialized. As such, various 3D image display technologies are being suggested. A currently commercialized 3D image display apparatus uses binocular parallax, and a viewer observes a 3D effect from different images being provided to the viewer's left and right eyes. A 3D image display apparatus may be an eyeglass-type 3D image display apparatus, which requires special eyeglasses, or a non-eyeglass-type 3D image display apparatus, which does not require eyeglasses.

Unfortunately, a 3D image display apparatus which merely provides two viewpoints, an image for a left eye and an image for a right eye, does not reflect the change of viewpoints that a viewer would perceive in a natural environment due to the movement of a viewer, and thus the ability to provide a "natural" 3D effect is limited. Hence, in order to provide a natural motion parallax, a multi-view 3D image display apparatus, which may provide a plurality of viewpoints, is suggested. A multi-view 3D image display apparatus is an apparatus which provides 3D images having different viewpoints to a plurality of viewing zones, respectively. However, in a multi-view 3D image display apparatus, crosstalk may be generated between different viewing zones, and thus a non-stereo area or a reverse-stereo area may be generated. Additionally, in order to provide an apparently "natural" motion parallax, there should be a lot of viewpoints. However, in the case of many viewpoints, the resolution of each individual viewpoint may be reduced. In particular, in the case of a 3D image display apparatus using a projection optical system, in order to increase the number of viewpoints, the number of projection optical systems should be increased. However, this would lead to an enlargement of the volume of the entire system. Further, a multi-view 3D image display apparatus which provides only a binocular parallax does not enable a viewer to enjoy a 3D image with only one eye.

Recently, a super multi-view 3D image display apparatus has been suggested so that a more natural motion parallax may be provided, and a viewer might enjoy a 3D image with only one eye. The super multi-view 3D image display apparatus provides an image having a plurality of viewpoints to one eye of a viewer. To this end, the super multi-view 3D image display apparatus forms an image having a plurality of viewpoints within an area smaller than the pupil size of one eye of the viewer. Hence, an image of a plurality of parallaxes is always projected on the retina of the viewer, and thus the viewer may observe a more natural 3D effect with only one eye.

Such a multi-view 3D image display apparatus may include an active optical device which may project displayed images on different viewing zones according to the viewpoints thereof. For example, an electrowetting prism device may be used as such an active optical device. An electrowetting prism device is an apparatus which allows light to be refracted in a particular direction by electrically controlling the direction of inclination of the interface between nonpolar liquid-like oil and polarized liquid-like water. An electrowetting prism device includes a plurality of prism cells, and at least four electrodes and a plurality of wiring and switching devices are connected to the four electrodes. Thus, there is a limited area (i.e., an aperture ratio), through which light passes, in the entire prism cell area.

SUMMARY

One or more exemplary embodiments provide an electrowetting prism device which has increased an aperture ratio due to a simplified electrode and wiring structure.

One or more exemplary embodiments provide a 3D image display apparatus capable of providing a multi-view 3D image using an electrowetting prism device.

According to an aspect of an exemplary embodiment, there is provided an electrowetting prism device including: a plurality of electrowetting prism cells arranged in a two-dimensional (2D) manner, wherein each of the electrode prism cells includes lower and upper transparent substrates disposed against each other, a vertical wall mounted on the lower transparent substrate so as to form a diamond-shaped space, a first electrode arranged along two adjacent sidewalls of the vertical wall, a second electrode arranged along the other remaining two adjacent sidewalls of the vertical wall to be disposed against the first electrode, first and second wires arranged on an upper surface of the lower transparent substrate to be electrically connected to the plurality of first and second electrodes, and a non-polarized liquid and a polarized liquid arranged within a space surrounded by the vertical wall.

The vertical wall may be formed in a mesh form to form a plurality of diamond-shaped spaces inside, the first electrode may be arranged along two sidewalls at a first side surface of the vertical wall, and the second electrode may be arranged along two sidewalls at a second side surface facing the first side surface of the vertical wall.

The first electrode and the second electrode may be bent in a form in which centers of the first electrode and the second electrode are reversed.

The plurality of electrowetting prism cells may be arranged in a 2D diamond lattice form.

The first and second wires may be formed in a zigzag form to coincide with the bent form of the first and second electrodes, and have forms reversed to each other.

Each of the electrowetting prism cells may further include a first gate line, a first transistor and a first capacitor which are arranged for the first electrode, and a second gate line, a second transistor and a second capacitor which are arranged for the second electrode.

The first gate line may be connected to a gate of the first transistor, the first wire and the first electrode may be connected a drain and a source of the first transistor, respectively, the second gate line may be connected to a gate of the second transistor, and the second wire and the second electrode may be connected to a drain and a source of the second transistor, respectively.

Each of the electrowetting prism cell may further include a dielectric film formed to cover the first and second electrodes, a hydrophobic coating formed along a surface of the dielectric film, and a common electrode arranged on a lower surface of the upper transparent substrate.

The dielectric film may have a multi-layer structure respectively formed of a plurality of different materials.

The dielectric film may include a first layer formed of a fluoropolymer CYTOP™, a second layer formed of $HfO_2$, and a third layer formed of Mo in distance order close to the electrodes.

A thickness of the first layer may be 300 Å, a thickness of the second layer may be 2000 Å, and a thickness of the third layer may be 2000 Å.

According to an aspect of another exemplary embodiment, there is provided a three-dimensional (3D) image display apparatus including an image generation unit for generating an image, and an electrowetting prism device for converting a path of light including the image generated from the image generation unit, and providing the image to a plurality of viewpoints.

The 3D image display apparatus may further include a 3D optical unit for dividing a viewpoint of the image into a plurality of viewpoints between the image generation unit and the electrowetting prism device.

The 3D optical unit may include one of a lenticular lens array, a micro lens array and a parallax barrier.

The image generation unit may include a display panel having a plurality of color sub-pixels for displaying an image.

A plurality of electrowetting prism cells within the electrowetting prism device may correspond to a plurality of color sub-pixels within the display panel, respectively.

The color sub-pixels of the display panel may be arranged in a diamond lattice form, red sub-pixels, green sub-pixels and blue sub-pixels may be alternately arranged in a horizontal direction, and color sub-pixels of each color may be arranged in a zigzag form in a vertical direction.

The image generation unit may generate images of different viewpoints in a time sequence.

A plurality of electrowetting prism cells within the electrowetting prism device may be synchronized with the image generation unit, and may refract light including images having different viewpoints at different angles.

BRIEF DESCRIPTION OF THE DRAWINGS

The above and other exemplary aspects and advantages will become more apparent by describing in detail exemplary embodiments with reference to the attached drawings in which.

DETAILED DESCRIPTION

Figure 1:
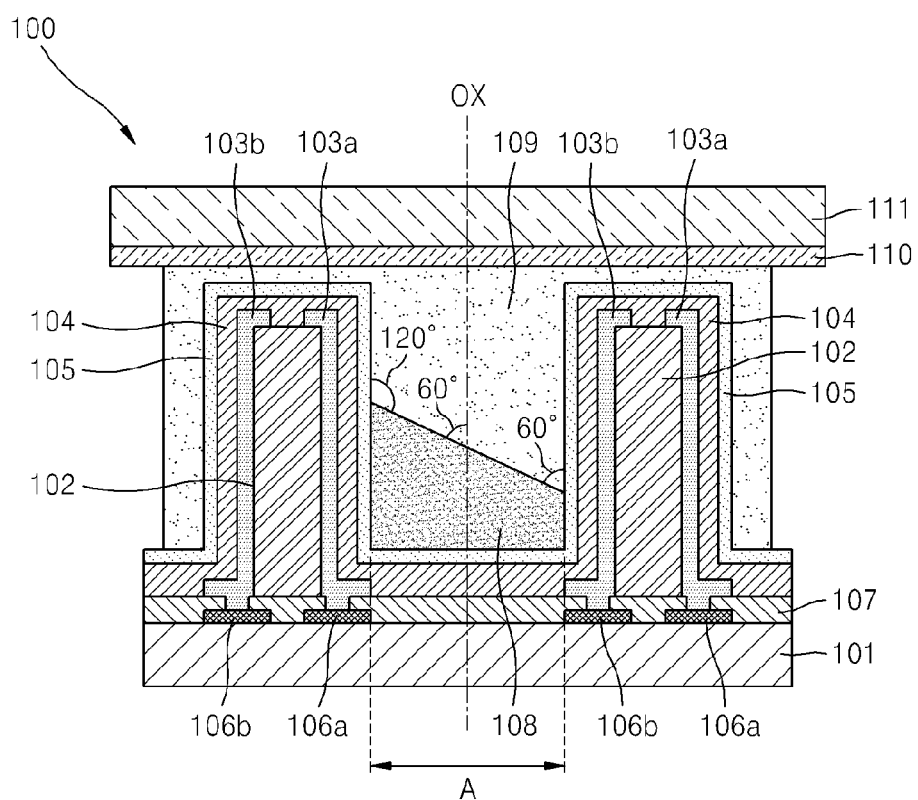
FIG. 1 is a cross-sectional view schematically illustrating a configuration of one prism cell of an electrowetting prism device according to an exemplary embodiment.

Hereinafter, an electrowetting prism device and a multi-view 3D image display apparatus using the same will be described in detail with reference to the attached drawings. Like reference numerals in the drawings denote like elements, and the size or thickness of each element may be exaggerated for the convenience of explanation. Further, the exemplary embodiments described below are merely examples, and various modifications for such embodiments are possible. Hereinafter, the terms "on," "on the top of", or the like are used to describe a non-contacting object as well as a contacting object.

FIG. 1 is a cross-sectional view schematically illustrating a configuration of one prism cell of an electrowetting prism device according to an exemplary embodiment.

Figure 2:
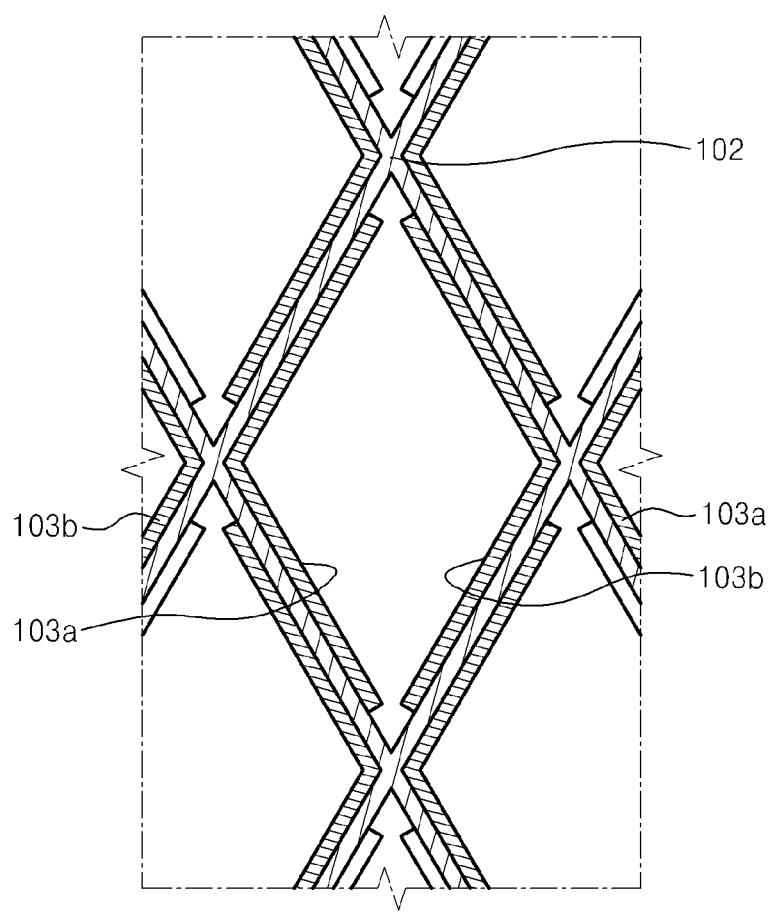
FIG. 2 is a conceptual view schematically illustrating an arrangement relationship between a wall and electrodes of one prism cell of the electrowetting prism device illustrated in FIG. 1.

Referring to FIGS. 1 and 2, an electrowetting prism cell 100 includes lower and upper transparent substrates 101 and 111 which face each other, and vertical walls 102, mounted on the lower transparent substrate 101, where the vertical walls define an inner diamond-shaped space, when viewed from a direction perpendicular to the surface of the substrate 101 on which they are formed. The electrowetting prism cell 100 further includes first and second electrodes 103a and 103b which are disposed against opposite sidewalls of the vertical walls 102, a dielectric film 104 which completely convers the first and second electrodes 103a and 103b, a hydrophobic coating 105 which completely covers the dielectric film 104, first and second wires 106a and 106b, which are arranged on the upper surface of the lower transparent substrate 101 and are electrically connected to the first and second electrodes 103a and 103b, respectively, a common electrode 110 arranged on a lower surface of the upper transparent substrate 111, and nonpolarized liquid 108 and polarized liquid 109 which are disposed within a space surrounded by the vertical walls 102.

The cross-sectional view of FIG. 1 appears to illustrate two separate vertical walls, but the vertical walls 102 may be joined as a single structure comprising a type of mesh forming a plurality of small spaces (the diamond-shaped spaces) therebetween. The first and second electrodes 103a and 103b may be disposed on opposite sides of one vertical wall 102. As illustrated in FIG. 1, the first electrode 103a and the second electrode 103b may be arranged such that they face each other within and across the spaced formed by the vertical walls 102. In FIG. 1, the second electrode 103b is disposed on the left side of the left vertical wall 102 and the first electrode 103a is disposed on the right wall of the right vertical wall 102.

FIG. 2 is a conceptual view schematically illustrating an arrangement relationship between the vertical walls 102 and electrodes 103a and 103b of the prism cell 100 of FIG. 1. As illustrated in FIG. 2, the vertical walls 102 may form a mesh, forming a plurality of spaces, each space having a diamond form, and an electrode 103a and an electrode 103b may be disposed within each space. For example, the first electrode 103a may be disposed along two adjacent sidewalls on the left side of the a space formed by the vertical walls 102, and the second electrode 103b may be disposed along the remaining two adjacent sidewalls on the right side of the space formed by the vertical walls, such that the electrode 103a and the electrode 103b face each other. As such, a central part of the first electrode 103a may be bent, so that the electrode forms a "<" shape, and a central part of the second electrode 103b may be bent so that the electrodes forms a ">" shape which is reversed with respect to the shape of the first electrode 103a.

The dielectric film 104, which covers the first and second electrodes 103a and 103b, electrically insulates the first and second electrodes 103a and 103b from each other and from the liquids 108 and 109 within the space formed by the vertical walls 102. The dielectric film 104 may completely cover the first and second electrodes 103a and 103b and extend to the bottom of the space. Further, the hydrophobic coating 105 formed along the surface of the dielectric film 104 may allow the polarized liquid-like water 109 to easily form a predetermined contact angle on the interface with the non-polarized liquid-like oil. The hydrophobic coating 105 may also completely cover the dielectric film 104 and extend to the bottom of the space.

Figure 3:
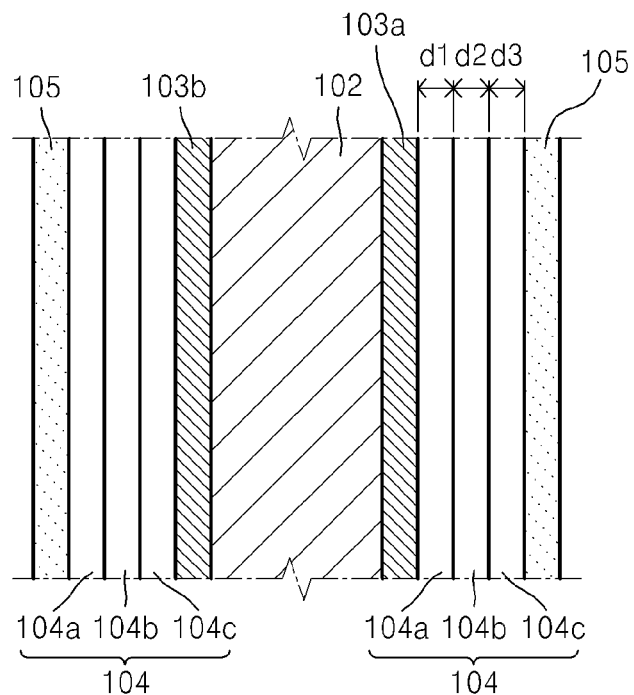
FIG. 3 is a partially cross-sectional view schematically illustrating a multi-layer structure of a dielectric film illustrated in FIG. 1.
Figure 4:
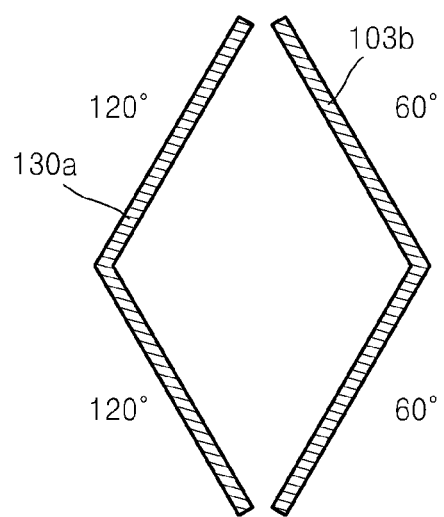
FIG. 4 is a conceptual view schematically illustrating an operation of one prism cell of the electrowetting prism device illustrated in FIG. 1.

In order to endure pressure created by the shaking of the liquids 108 and 109 and to prevent chemical reactions with the liquids 108 and 109, the dielectric film 104 may have a multi-layer structure formed of a plurality of different materials. For example, the cross-sectional view of FIG. 3 schematically illustrates a multi-layer structure of the dielectric film 104. Referring to FIG. 3, the dielectric film 104 may include, for example, a first layer 104a, adjacent to the hydrophobic coating 105, formed of a fluoropolymer CYTOP™, a second layer 104b formed of $HfO_2$, and a third layer 104c formed of Mo, adjacent to the electrodes 103a and 103b. The thickness d1 of the first layer 104a may be about 100 Å, the thickness d2 of the second layer 104b may be about 2000 Å, and the thickness d3 of the third layer 104c may be about 2000 Å.

The non-polarized liquid 108 and the polarized liquid 109, which are disposed within the space formed by the vertical walls 102, may have a high transmittance capable of transmitting light with little loss, and may have different refractive indexes so that light is refracted at the interface between the liquids. Further, as illustrated in FIG. 1, the density of the non-polarized liquid 108 may be higher than the density of the polarized liquid 109 so that the non-polarized liquid 108 may be arranged in the lower side of the space. There are various materials of the non-polarized liquid 108 and the polarized liquid 109 which satisfy such conditions. For example, deionized water (DI water) including NaCl of about 0.005M or sodium Dodecyl sulfate (SDS) of about 0.1 weight % may be used as the polarized liquid 109. Further, for example, Bromonaphtalene, chloronaphtalene, etc. may be used as the non-polarized liquid 108.

Further, as illustrated in FIG. 1, the non-polarized liquid 108 at the lower side of the space formed by the vertical walls 102 may be separately disposed within each electrowetting prism cell 100, but the polarized liquid 109 at the upper side of the space may extend throughout all of the entire electrowetting prism cells 100 in the electrowetting prism device.

To this end, a certain space may exist between the lower surface of the upper transparent substrate 111 and the upper surface of the vertical wall 102, to enable the polarized liquid to flow between the various spaces formed by the vertical walls 102.

Additionally, a passivation layer 107 may be formed on the lower transparent substrate 101 and the wires 106a and 106b so that the wires 106a and 106b contact only the electrodes 103a and 103b. The passivation layer 107 may cover the wires 106a and 106b except for those portions of the wires which are electrically connected to the electrodes 103a and 103b. In this case, the vertical wall 102, and the dielectric film 104 may be formed on the passivation layer 107.

In the electrowetting prism cell 100 having the above-described structure, the contact angle between the interface of the polarized liquid 109 and the non-polarized liquid 108 and the vertical wall 102 may be varied based on the voltage applied to the two electrodes 103a and 103b. Thus, if the voltage applied to the electrodes 103a and 103b is appropriately regulated, the interface between the polarized liquid 109 and the non-polarized liquid 108 may be made to be perpendicular to the optical axis or may be tilted with respect to the optical axis. For example, as shown in FIG. 1, a predetermined voltage may be applied to the first electrode 103a so that the interface may form a contact angle of 120° with the at the left side of the vertical wall 102, on which the first electrode 103a is formed. A predetermined voltage may also be applied to the second electrode 103b so that the interface may form a contact angle of 60° at the right side of the vertical wall 102 on which the second electrode 103b. Then the interface between the polarized liquid 109 and the non-polarized liquid 108 may be tilted with respect to against the optical axis (OX) at an angle of about 60° as illustrated in FIG. 1. According to this principle, the electrowetting prism cell 100 may refract incident light at a desired angle so as to change the direction of the incident light.

As illustrated in FIG. 2, the electrowetting prism device according to an exemplary embodiment may include a plurality of electrowetting prism cells 100 arranged in a 2D diamond lattice form. In the electrowetting prism device, all electrowetting prism cells 100 may operate in synchrony, or each may operate independently of the others. That is, all electrowetting prism cells 100 may operate so that the interface in each of the cells 100 is at the same angle of inclination, or each electrowetting prism cell may operate such that each might have an interface at a different inclination. In order to make all electrowetting prism cells 100 within the electrowetting prism device operate in synchrony, the wires 106a and 106b may be directly connected to the electrodes 103a and 103b. For example, the first wire 106a may be directly connected to the first electrode 103a, and the second wire 106b may be directly connected to the second electrode 103b.

Figure 5:
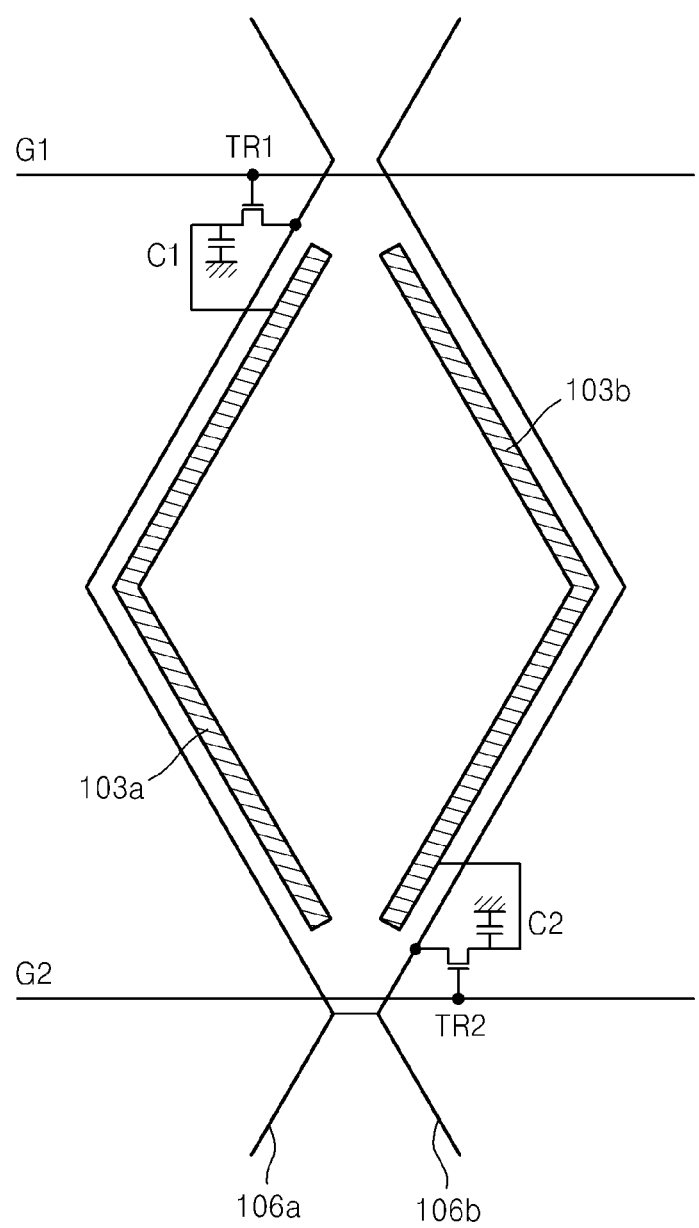
FIG. 5 is a conceptual view schematically illustrating an arrangement relationship between electrodes and wirings of one prism cell of the electrowetting prism device illustrated in FIG. 1.

Alternately, in order to make each electrowetting prism cell 100 within the electrowetting prism device operate independently, a switching device may be provided for each electrowetting prism cell 100. For example, as shown in FIG. 5, gate lines G1 and G2, transistors TR1 and TR2 and capacitors C1 and C2 may be respectively arranged for each of the electrodes 103a and 103b of one electrowetting prism cell 100. Specifically, the first gate line G1 may be connected to the gate of the first transistor TR1, the first wire 106a and the first electrode 103a may be respectively connected to the drain and source of the first transistor TR1, and the first capacitor C1 may be connected between the source of the first transistor TR1 and the ground. Further, the second gate line G2 may be connected to the gate of the second transistor TR2, the second wire 106b and the second electrode 103b may be respectively connected to the drain and source of the second transistor TR2, and the second capacitor C2 may be connected between the source of the second transistor TR2 and the ground. Then the transistors TR1 and TR2 may optionally regulate the inclination angle of the interface for the electrowetting prism cell 100 of which the transistors TR1 and TR2 have been turned on. Further, as illustrated in FIG. 5, the first and second wires 106a and 106b may be formed in a zigzag pattern so as to coincide with the bent form of the first and second electrodes 103a and 103b, and the first wire 106a and the second wire 106b may have left-right-reversed forms.

According to the above-described exemplary embodiment, each electrowetting prism cell 100 includes only two electrodes 103a and 103b and two wires 106a and 106b. Further, when the electrowetting prism cells 100 are intended to be independently operated, each electrowetting prism cell 100 includes only two gate lines G1 and G2, two transistors TR1 and TR2, and two capacitors C1 and C2. In the case of the conventional electrowetting prism device including a plurality of prism cells arranged in a rectangular check pattern, each prism cell includes four electrodes. Further, one wire, one gate line, one transistor and one capacitor are connected to each electrode, and thus each prism cell further includes four wires, four gate lines, four transistors and four capacitors. As such, a related art electrowetting prism device has a limit in increasing an aperture ratio, and thus light may be significantly lost. In contrast, the structure of the electrowetting prism cell 100 according to an exemplary embodiment may be simplified because the number of electrodes, wires and switching devices is reduced to half. Hence, the area of the aperture of FIG. 1 may be increased, and thus the aperture ratio may be improved and the loss of light may also be reduced.

Figure 6:
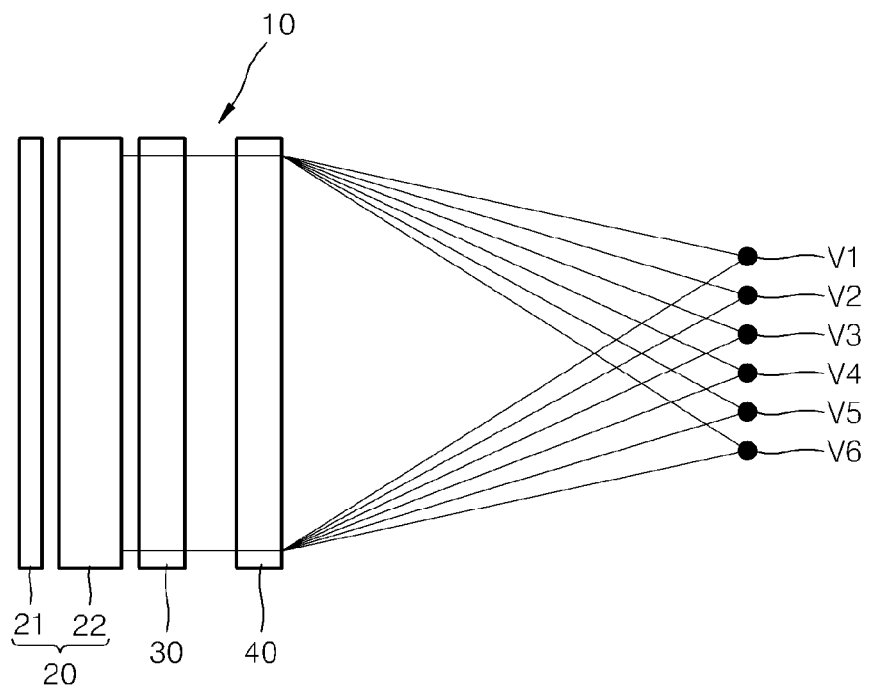
FIG. 6 is a conceptual view schematically illustrating a configuration of a multi-view 3D image display apparatus according to an exemplary embodiment.

If the electrowetting prism device is used in conjunction with a 3D image display apparatus, the luminance of the 3D image display apparatus is improved, and the power consumption may be reduced. FIG. 6 is a conceptual view schematically illustrating the structure of a multi-view 3D image display apparatus including the above-described electrowetting prism device according to an exemplary embodiment.

Referring to FIG. 6, a 3D display apparatus 10 according to an exemplary embodiment may include an image generation unit 20 for generating an image, and an electrowetting prism device 40 for refracting light from the image generation unit 20. The 3D display apparatus 10 may further optionally include a 3D optical unit 30 for separating viewpoints between the image generation unit 20 and the electrowetting prism device 40.

The image generation unit 20 may include a light source 21 and a display panel 22 which forms an image using light from the light source 21. For example, the display panel 22 may include a liquid crystal display (LCD), a digital micromirror device (DMD), a liquid crystal on silicon (LCOS) or a spatial light modulator (SLM). FIG. 6 illustrates that the image generation unit 20 includes a separate light source, but this is merely an example, and the present embodiment is not limited thereto. For example, the image generation unit may include a light-emissive type display panel such as an organic light emitting device (OLED) and a plasma display panel (PDP) which do not need a separate light source.

The electrowetting prism device 40 refracts the light passing therethrough, and thereby forms an image having multiple view points V1 to V6. For example, the electrowetting prism device 40 may be composed of an array of the above-described electrowetting prism cells 100, and may provide an image having a plurality of viewpoints in a time division scheme by electrically adjusting the angle at which light is refracted.

Figure 7A:
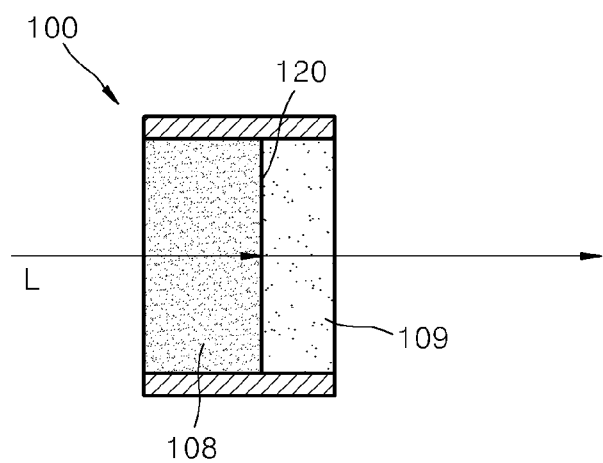
FIGS. 7A to 7C are conceptual views illustrating an operation of one prism cell of an electrowetting prism device of the multi-view 3D image display apparatus illustrated in FIG. 6.
Figure 7B:
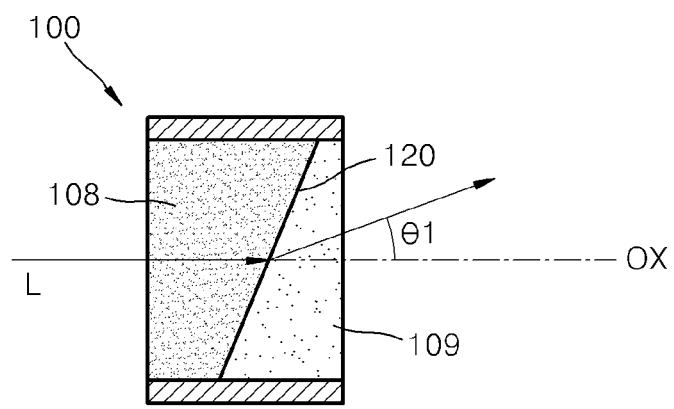
Figure 7C:
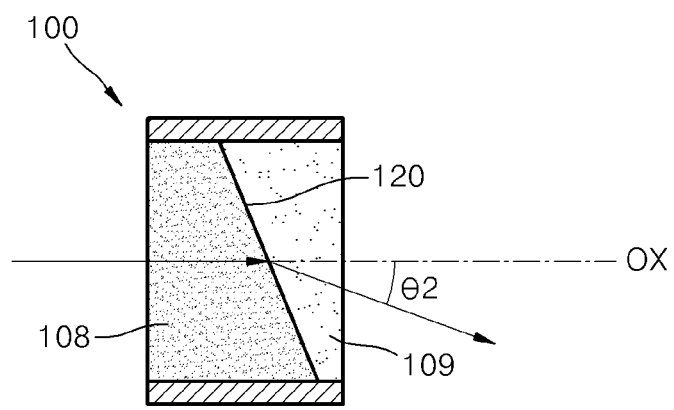

For example, as illustrated in FIG. 7A, when the interface between the polarized liquid 109 and the non-polarized liquid 108 is not tilted in the electrowetting prism cell 100, light L passes through the electrowetting prism cell 100 without being refracted. Further, as illustrated in FIG. 7B, if the interface is tilted at a first angle by electrically controlling the electrowetting prism cell 100, the light is refracted at the interface by the angle of $+\theta 1$ with respect to the optical axis (OX), and thereby passes through the electrowetting prism cell 100. In contrast, as illustrated in FIG. 7C, if the interface 120 is tilted at a second angle by electrically controlling the electrowetting prism cell 100, the light is refracted at the interface by the angle of $-\theta 2$ with respect to the optical axis (OX), and thereby passes through the electrowetting prism cell 100.

The image generation unit 20 may generate images of different viewpoints in a time sequence, and a plurality of electrowetting prism cells 100 within the electrowetting prism device 40 may be synchronized with the image generation unit 20 so that the light including images of different viewpoints may be refracted by the electrowetting prism cells 100. For example, when the image of the first viewpoint is output by the image generation unit 20, the electrowetting prism cell 100 may be operated so that the interface is not tilted as illustrated in FIG. 7A. Further, when the image of the second viewpoint is output by the image generation unit 20, the electrowetting prism cell 100 may be operated so that the interface is tilted at the first angle as illustrated in FIG. 7B. Further, when the image of the third viewpoint is output by the image generation unit 20, the electrowetting prism cell 100 may be operated so that the interface is tilted at a second angle as illustrated in FIG. 7C. Images of more viewpoints may be displayed according to the operation speed of the electrowetting prism cell 100 and the inclination angle of the refracting surface.

The 3D optical unit 30 may be an optical device, which may divide viewing zones, such as a lenticular lens array, a micro lens array or a parallax barrier. The 3D optical unit 30 may set images, which are output in the image generation unit 20, to be divided into a plurality of viewing zones and then be focused. The technology of dividing viewing zones by the 3D optical unit 30 is already well known, and thus the detailed description thereof will be omitted here. According to an exemplary embodiment, the number of viewpoints may be increased by using the 3D optical unit 30 in conjunction with the electrowetting prism device 40. For example, when the 3D optical unit 30 divides an image into two viewpoints and the electrowetting prism device 40 divides the image into three viewpoints, images of a total of six viewpoints may be displayed. In particular, the electrowetting prism device 40 may control the angle of the interface in various ways according to electrical control, and thus the number of viewpoints may be significantly increased using the electrowetting prism device 40. Further, the electrowetting prism device 40 converts the light path of the image generated in the image generation unit 20 so as to change the viewpoint, and thus the number of viewpoints may be increased without deterioration of the resolution. Hence, the 3D display apparatus 10 according to an exemplary embodiment may implement a super multi-view 3D image without deterioration of the resolution.

Figure 8:
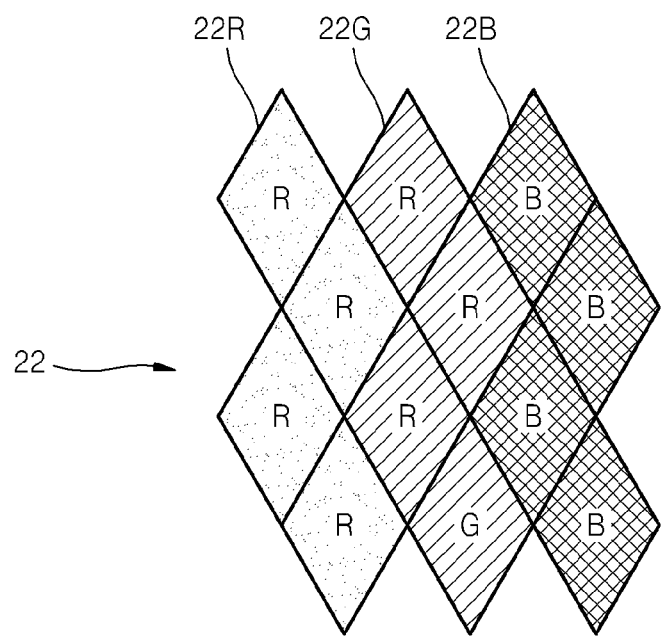
FIG. 8 is a conceptual view illustrating a pixel arrangement structure of a display panel of the 3D image display apparatus illustrated in FIG. 6.

Further, the display panel 22 of the image generation unit 20 includes a plurality of color sub-pixels for displaying an image, and the display panel 22 may be configured such that a plurality of electrowetting prism cells 100 within the electrowetting prism device 40 may respectively correspond to the plurality of color sub-pixels within the display panel 22. That is, as described above, the electrowetting prism cells 100 may be arranged in a diamond lattice form. Hence, color sub-pixels of the display panel 22 may also be arranged in a diamond lattice form as illustrated in FIG. 8. In this case, a red sub-pixel 22R, a green sub-pixel 22G and a blue sub-pixel 22B may be alternately arranged in a horizontal direction, and the color sub-pixels 22R, 22G and 22B of each color may be arranged in zigzag form in a vertical direction.

While exemplary embodiments have been particularly shown and described herein, it will be understood by those of ordinary skill in the art that various changes in form and details may be made therein without departing from the spirit and scope of the inventive concept as defined by the following claims.

What is claimed is:

1. An electrowetting prism device comprising:
a plurality of electrowetting prism cells arranged in a two-dimensional (2D) array,
wherein each of the electrode prism cells comprises:
a lower transparent substrate and an upper transparent substrate;
vertical walls mounted on an upper surface of the lower transparent substrate such that a space is defined within the vertical walls;
a first electrode disposed within the space on the inner surface of each of two adjacent first vertical walls;
a second electrode disposed within the space on the inner surface of each of two adjacent second vertical walls; and
a non-polarized liquid disposed within the space defined by the vertical walls and a polarized liquid disposed within the space defined by the vertical walls,
wherein the vertical walls form a mesh defining a plurality of diamond-shaped spaces, wherein, each of the plurality of diamond-shaped spaces is associated with one of the plurality of electrowetting prism cells.

2. The electrowetting prism device of claim 1, wherein each of the electrode prism cells further comprises a first wire disposed on the upper surface of the lower transparent substrate and electrically connected to the first electrode, and a second wire disposed on the upper surface of the lower transparent substrate and electrically connected to the second electrode, wherein the first electrode is bent into a shape mirroring a shape into which the second electrode is bent.

3. The electrowetting prism device of claim 1, wherein the plurality of electrowetting prism cells are arranged in a 2D diamond lattice form.

4. The electrowetting prism device of claim 3, wherein the first wire is formed in a zigzag shape coinciding with a shape of the first electrode, and the second wire is formed in a zigzag shape coinciding with the shape of the second electrode electrodes.

5. The electrowetting prism device of claim 1, wherein each of the electrowetting prism cells further comprises:
a dielectric film covering the first electrode and the second electrode;
a hydrophobic coating formed on a surface of the dielectric film; and
a common electrode disposed on a lower surface of the upper transparent substrate.

6. The electrowetting prism device of claim 5, wherein the dielectric film has a multi-layer structure comprising a plurality of different materials.

7. The electrowetting prism device of claim 6, wherein the dielectric film comprises a first layer, adjacent to the hydrophobic coating, formed of a fluoropolymer, a second layer formed of $HfO_2$, and a third layer formed of Mo.

8. The electrowetting prism device of claim 7, wherein a thickness of the first layer is 300 Å, a thickness of the second layer is 2000 Å, and a thickness of the third layer is 2000 Å.

9. An electrowetting prism device comprising:
a plurality of electrowetting prism cells arranged in a two-dimensional (2D) array,
wherein each of the electrode prism cells comprises:
a lower transparent substrate and an upper transparent substrate;
vertical walls mounted on an upper surface of the lower transparent substrate such that a space is defined within the vertical walls;
a first electrode disposed within the space on the inner surface of each of two adjacent first vertical walls;
a second electrode disposed within the space on the inner surface of each of two adjacent second vertical walls; and
a non-polarized liquid disposed within the space defined by the vertical walls and a polarized liquid disposed within the space defined by the vertical walls;
a first gate line, a first transistor and a first capacitor which correspond to the first electrode; and
a second gate line, a second transistor and a second capacitor which correspond to the second electrode.

10. The electrowetting prism device of claim 9, wherein the first gate line is connected to a gate of the first transistor, the first wire is connected to a drain of the first transistor, the first electrode is connected to a source of the first transistor, the second gate line is connected to a gate of the second transistor, the second wire is connected to a drain of the second transistor, the second electrode is connected to a source of the second transistor.

11. A three-dimensional (3D) image display apparatus comprising:
an image generation unit which generates an image; and
an electrowetting prism device which converts a path of light of the image generated by the image generation unit, and provides the image to a plurality of viewpoints,
wherein the electrowetting prism device comprises:
a plurality of electrowetting prism cells arranged in a two-dimensional (2D) array,
wherein each of the electrode prism cells comprises:
a lower transparent substrate and an upper transparent substrate;
vertical walls mounted on an upper surface of the lower transparent substrate such that a space is defined within the vertical walls;
a first electrode disposed within the space on the inner surface of each of two adjacent first vertical walls;
a second electrode disposed within the space on the inner surface of each to two adjacent second vertical walls; and
a non-polarized liquid disposed within the space defined by the vertical walls and a polarized liquid disposed within the space defined by the vertical walls,
wherein the vertical walls form a mesh defining a plurality of diamond-shaped spaces, wherein, each of the plurality of diamond-shaped spaces is associated with one of the plurality of electrowetting prism cells.

12. The 3D image display apparatus of claim 11, wherein each of the electrode prism cells further comprises a first wire disposed on the upper surface of the lower transparent substrate and electrically connected to the first electrode, and a second wire disposed on the upper surface of the lower transparent substrate and electrically connected to the second electrode, wherein the first electrode is bent into a shape mirroring a shape into which the second electrode is bent.

13. The 3D image display apparatus of claim 11, wherein the plurality of electrowetting prism cells are arranged in a 2D diamond lattice form.

14. The 3D image display apparatus of claim 13, wherein the first wire is formed in a zigzag shape coinciding with a shape of the first electrode, and the second wire is formed in a zigzag shape coinciding with a shape of the second electrode.

15. The 3D image display apparatus of claim 11, wherein each of the electrowetting prism cells further comprises:
    a dielectric film which covers the first electrode and the second electrode;
    a hydrophobic coating disposed on a surface of the dielectric film; and
    a common electrode disposed on a lower surface of the upper transparent substrate.

16. The 3D image display apparatus of claim 11, wherein the image generation unit comprises a display panel comprising a plurality of color sub-pixels which display the image.

17. The 3D image display apparatus of claim 16, wherein each of the plurality of electrowetting prism cells corresponds to one of the plurality of color sub-pixels.

18. The 3D image display apparatus of claim 17, wherein the plurality of color sub-pixels are arranged in a diamond lattice array in which red sub-pixels, green sub-pixels and blue sub-pixels are alternately arranged in a horizontal direction, and in which the red sub-pixels, the green sub-pixels and the blue sub-pixels are arranged in a zigzag form in a vertical direction.

19. The 3D image display apparatus of claim 11, wherein the image generation unit generates images of the plurality different viewpoints in a time sequence.

20. The 3D image display apparatus of claim 19, wherein the plurality of electrowetting prism cells are synchronized with the image generation unit, and wherein the plurality of electrowetting prism cells refract light of images having different viewpoints at different angles.

21. A three-dimensional (3D) image display apparatus comprising:
    an image generation unit which generates an image; and
    an electrowetting prism device which converts a path of light of the image generated by the image generation unit, and provides the image to a plurality of viewpoints,
    wherein the electrowetting prism device comprises:
    a plurality of electrowetting prism cells arranged in a two-dimensional (2D) array,
    wherein each of the electrode prism cells comprises:
        a lower transparent substrate and an upper transparent substrate;
        vertical walls mounted on an upper surface of the lower transparent substrate such that a space is defined within the vertical walls;
        a first electrode disposed within the space on the inner surface of each of two adjacent first vertical walls;
        a second electrode disposed within the space on the inner surface of each to two adjacent second vertical walls;
        a non-polarized liquid disposed within the space defined by the vertical walls and a polarized liquid disposed within the space defined by the vertical walls;
    a first gate line, a first transistor and a first capacitor which correspond to the first electrode; and
    a second gate line, a second transistor and a second capacitor which correspond to the second electrode.

22. A three-dimensional (3D) image display apparatus comprising:
    an image generation unit which generates an image; and
    an electrowetting prism device which converts a path of light of the image generated by the image generation unit, and provides the image to a plurality of viewpoints,
    wherein the electrowetting prism device comprises:
    a plurality of electrowetting prism cells arranged in a two-dimensional (2D) array,
    wherein each of the electrode prism cells comprises:
        a lower transparent substrate and an upper transparent substrate;
        vertical walls mounted on an upper surface of the lower transparent substrate such that a space is defined within the vertical walls;
        a first electrode disposed within the space on the inner surface of each of two adjacent first vertical walls;
        a second electrode disposed within the space on the inner surface of each to two adjacent second vertical walls;
        a non-polarized liquid disposed within the space defined by the vertical walls and a polarized liquid disposed within the space defined by the vertical walls; and
    a 3D optical unit, disposed on an optical path between the image generation unit and the electrowetting prism device, which divides a single viewpoint of the image into the plurality of viewpoints.

23. The 3D image display apparatus of claim 22, wherein the 3D optical unit comprises one of a lenticular lens array, a micro lens array and a parallax barrier.

* * * * *